May 21, 1935. J. STONE Re. 19,584

SAFETY FUSE DEVICE

Original Filed Sept. 9, 1929

Inventor:
Jesse Stone
By: Wilkinson, Huxley, Byron & Knight
Attys.

Reissued May 21, 1935 Re. 19,584

UNITED STATES PATENT OFFICE 19,584

SAFETY FUSE DEVICE

Jesse Stone, Pittsburgh, Pa., assignor to Economy Fuse and Manufacturing Company, Chicago, Ill., a corporation of New York Original No. 1,824,415, dated September 22, 1931, Serial No. 391,450, September 9, 1929. Application for reissue September 21, 1933, Serial No. 690,405

9 Claims. (Cl. 200—119)

The present invention relates to electrical safety fuse devices and has for its object the provision of a fuse plug connection which prevents electrical connections being made in the electric circuit by improper means, such as the use of metal slugs, coins, wires, tinfoils, oversize fuse plugs, or the like.

The present device is so constructed, that the improvements which will be herein more fully described may be used with the ordinary fuse blocks now in use, while at the same time the fuse plugs now in use may not be used with any fuse blocks to which my improvements have been applied.

In order to use any fuse block having my invention added thereto, a special type of fuse plug is required, the nature of which will also be fully described in this specification.

The adaptability of my invention for use without changing of parts, in connection with the ordinary type of fuse blocks in common use, will readily be understood from the description, and it will be at once seen that this feature constitutes a very desirable one, in my invention.

Two important features of the present invention are the following, to wit, the modification of the bottom end of an ordinary fuse plug, by the addition of a contact pin of considerable length, and the addition of a bottom disc, having a concentric projecting ring preferably formed integral therewith; and secondly, a special washer, called an adapter, having a surface formed complementary to the base of the fuse plug, and provided with a central perforation adapted to permit the contact pin to pass therethrough.

The use of the combined features just named, provides a means of preventing surreptitious use of the electrical fuse block plug, and electrical circuit, by the use of slugs, tinfoils, wires, etc.

In the drawing forming part of the present specification,

Figure 1:
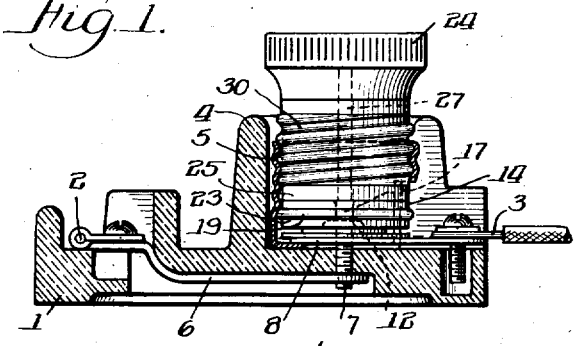
Figure 1 is a sectional view of my invention mounted in a fuse block, and taken on line 1—1 of Figure 2.
Figure 4:
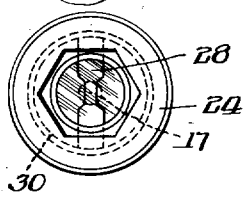
Figure 4 is a top plan view of the fuse plug.
Figure 5:
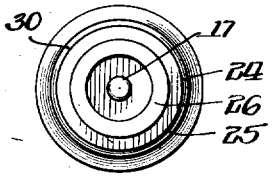
Figure 5 is a bottom view of the fuse plug.
Figure 2:
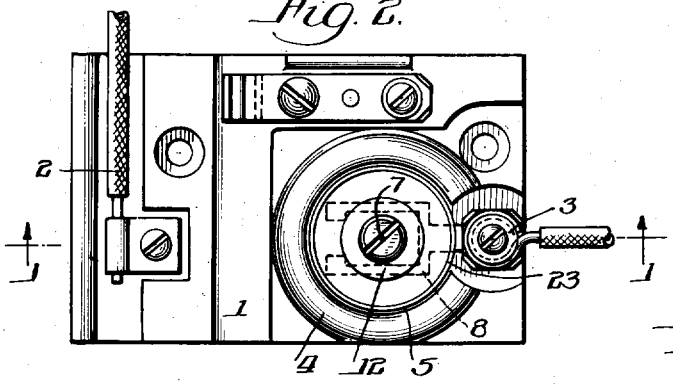
Figure 2 is a plan view of the fuse block shown in Figure 1, the fuse plug and the special washer, or adapter being omitted for clearness of illustration.

In the drawing, the numeral 1, indicates a porcelain base, called the fuse block, of the form shown, provided with the usual necessary parts, such as the ingoing or feeder connection 2, and the outgoing branch circuit connection 3, the cup-shaped recess 4, with a metal ferrule 5 seated therein. The connection 2, leads by means of the bent plate 6 to the contact pin 7, shown clearly in Figure 1.

The connection 3 is provided with a yoke 8, which is accommodated within the ferrule 5, and lies on the bottom 9 thereof. Above the yoke is an insulating thin washer 10, and a metal holding washer 11, and it is seen that the contact screw 7 passes through the cluster of parts just named, and down through the porcelain fuse block to the bent plate 6, and is secured thereto, in the usual fashion. It will be noted the head 12 of the contact screw 7 is flattened somewhat, so that it seats nicely in the bottom recess 13 of the special "Micarta" washer 14, see Figure 3.

This special washer, 14, or adapter is made preferably of a hard, non-conductive, material, such as compounded substances like "Micarta", which is composed of mica and other substances, commonly used in the trade. The purpose of requiring substantially hard material, will be more fully described below.

Figure 6:
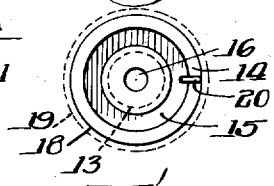
Figure 6 is a plan view of the special washer or adapter.
Figure 7:
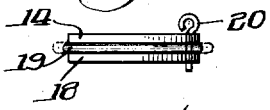
Figure 7 is a side view of Figure 6.
Figure 3:
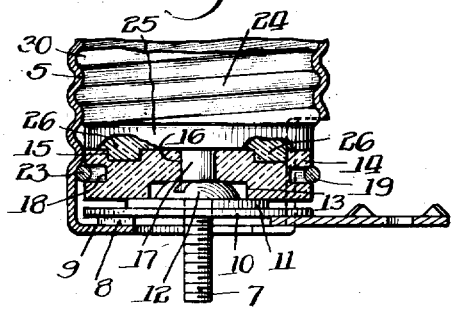
Figure 3 is a vertical partial section of the base of the fuse plug, and the adapter with associated parts.
Figure 9:
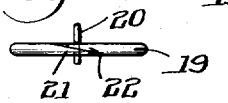
Figure 9 is a side view of the ring shown in Figure 8.
Figure 8:
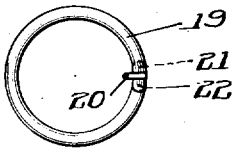
Figure 8 is a plan view of a locking spring ring used in connection with the adapter.

The cross-sectional shape or form of the adapter 14 is shown in Figure 3, and a plan view in Figure 6, in which it is seen that a concentric recess 15 is formed in the top of same and a perforation 16 passes through the center, adapted to receive the fuse plug contact pin 17. On the bottom of the adapter is a depression or recess 13, before described, and on its periphery, is a groove 18, adapted to receive the spring keeper, or holding wire 19. It will be seen from Figures 6 to 9 inclusive, that a small vertical holding pin 20, is inserted in the perforated ends 21, and 22 of the spring wire 19, which ends are slightly flattened to accommodate the double thickness to the groove 18 of the adapter. This pin is only for a temporary purpose, to wit, to hold the spring keeper or wire in a compressed position within the periphery of the adapter, as shown in Figure 7. It will be seen that while the spring wire 19 is in compressed position, that the adapter can be inserted freely within the ferrule 5, and placed at the bottom thereof, on top of the head 12, of the contact screw 7, with the former in the recess 13. When the adapter is in this position the pin 20 is withdrawn, and the wire 19 springs outward, and locks itself in the grooves 23 of the ferrule 5, and the adapter then cannot be removed without destroying ferrule 5. The purpose of this is to enable the ordinary ferrule of the fuse block to be used with my invention, without any changes being made. It is evident that this is a very important feature of the device, in that the present fuse blocks can be used without changes in their construction.

The fuse plug base, which is newly formed in the present invention, consists of the following. The portion of the fuse plug 24, which is above the corrugated projecting disc 25, is substantially the same as in common use, except that the length of the plug is shortened. Mounted on the plug 24, is the fuse plug disc 25, which is formed preferably of the same material as the adapter, to wit, of a hard, insulating pressed substance, or compound, which has been made under hydraulic or other great pressure. On the face of the disc 25, is mounted a concentric projecting ring 26, preferably made integral therewith and also formed complementary in shape with the recess 15 of the adapter before described, so it is evident the fuse plug base fits snugly into the upper face of the adapter, and the contact pin passes through the center perforation 16 of the latter and makes contact with the top 12 of the contact screw 7, when the fuse plug 24 is screwed "home" in the threads of the ferrule 5. The contact pin may be mounted in any suitable rigid manner to the upper portion of the fuse plug 24, and the latter has the usual fusible element 27 within it for carrying the current from the contact pin to the fuse 28, which in turn leads same to the metal screw threads covering the plug at 30, which in turn contact the threads of the ferrule 5. From ferrule 5 it reaches the yoke 8 and the branch circuit connection 3.

From what has been said it is seen that electric current comes in through the feeder connection 2, passes through bent plate 6, into contact screw 7. Then to the contact pin 17, and through the parts just described above to the branch circuit connection 3.

With reference to the surreptitious use of the device, it is quite evident that coins cannot be used in any manner to form a connection electrically between the head 12 of the contact screw 7, and walls of the ferrule 5, which is necessary in order to close the circuit from connections 2 to 3.

Should a piece of wire be wrapped around the contact pin 17 of the fuse plug, in such a manner as to extend diametrically across the base of the fuse plug, to make a contact with the ferrule 5, and the plug then screwed "home", it will be found that if the wire is heavy enough to resist the mutilating effect of the complementary corrugated parts of the plug and adapter, the lower end of the contact pin 17 will not, due to the thickness of the wire reach the head 12 of the contact screw, and the circuit will not be closed. If tinfoil, or very light wire is laid from the head 12 of the contact screw, to ferrule 5, turning effect of the plug as it is screwed to its seat, and the shearing effect of the complementary corrugations of the plug and adapter, will shear and mutilate the wire or tinfoil completely. If the wire or tinfoil is fine, or thin enough to conform to the shape of the complementary corrugations of the plug and adapter, it will be partially sheared, and so mutilated, that it will not have a current carrying capacity of over the fifteen amperes, the usual safe carrying capacity of the electrical system, and in this case will not injure the same.

I claim:

1. In a safety fuse device, a fuse block having a feeder connection, and a branch circuit connection, a ferrule mounted in the block, an adapter having a perforated center, a concentric recess formed in the upper face of the adapter, and a peripheral recess formed in the adapter, a spring locking wire adapted to fit in the peripheral recess, and lock the adapter within the ferrule, a fuse plug having a centrally disposed contact pin therein, a fuse plug disc having a concentric projecting ring thereon formed complementary to the concentric adapter recess, a contact screw mounted in the fuse block, means connecting the contact screw with the feeder connection, and means connecting the contact pin with the branch circuit connection.

2. In a safety fuse device, an adapter having a central perforation, a concentric recess formed in its upper face, a centrally disposed recess formed in the bottom of said adapter, a peripheral groove in the periphery of the adapter, a spring ring mounted in the peripheral groove, and means for holding the spring ring within the peripheral limits of the adapter.

3. In a safety fuse device, an adapter having a central perforation therein, a concentric recess in its upper surface, a recess in its bottom face, a peripheral groove formed on the outer walls of the adapter, a spring ring mounted in the groove, a fuse plug having a central contact pin, adapted to pass through the central perforation of the adapter, and a concentric projecting ring on the bottom of the fuse plug formed complementary to the concentric recess of the adapter.

4. In a safety fuse device, a ferrule, having a number of screw threads formed therein, an adapter having a peripheral groove and a pair of alined holes therethrough, a split spring ring having tapered overlapping ends, and a pair of alineable holes therethrough mounted in the groove, and holding and releasing means comprising a holding pin adapted to pass through the holes in the adapter and split ring for holding the spring ring within the periphery of the adapter while the same is being mounted in the ferrule, and for releasing the ends of said ring when the latter is in desired position within the ferrule.

5. In a safety fuse device, a fuse block having incoming and out-going electrical circuit connections, a contact screw having connections with the incoming electric circuit connection, an adapter having a central perforation therethrough, a concentric recess in the upper face of the adapter, a recess in the adapter for accommodating the head of the contact screw, a ferrule on the fuse block having threads formed therein, a fuse plug having a contact pin mounted therein, a disc on the base of the fuse plug having a concentric projection thereon, formed complementary to the concentric recess of the adapter, for permitting the contact pin to form an electrical connection with the contact screw, means for locking the adapter in the ferrule grooves, and means connecting the contact pin with the out-going circuit connection.

6. In a safety fuse device, a split spring ring, having tapered ends, adapted to slide upon each other, and having perforations in said ends adapted to be in alignment when the spring is in a contracted position, and a holding pin adapted to pass through the perforations, and hold the spring in contracted position.

7. In a safety fuse device, an adapter, having a peripheral recess formed therein, and a pair of perforations in alignment with each other, a split spring ring, having a pair of perforations therein which can be aligned with each other and the perforations in the adapter when the spring ring is in a contracted position, and a pin adapted to pass through all the perforations, and hold the spring ring in contracted position, within the peripheral limits of the adapter circumference.

8. In a safety fuse device, a fuse block having incoming and outgoing electrical circuit connections, a contact element having connections with the incoming electrical circuit connection, an adapter having a central perforation therethrough, a concentric recess in the upper face of the adapter, a recess in the adapter for accommodating the head of said contact element, a ferrule on the fuse block having threads formed therein, a fuse plug having a contact pin mounted therein, a disc on the base of the fuse plug having a concentric projection thereon, formed complementary to the concentric recess of the adapter, for permitting the contact pin to form an electrical connection with the contact element, means for locking the adapter in the ferrule grooves, and means connecting the contact pin with the outgoing circuit connection.

9. In a safety fuse device, a fuse block having incoming and outgoing electrical circuit connections, a contact element having connection with one of said electrical circuit connections, an adapter having a central perforation therethrough a concentric recess in the upper face of the adapter, a ferrule on the fuse block having threads formed therein, a fuse plug having a contact pin mounted therein and a base having a concentric projection thereon, formed complementary to the concentric recess of the adapter, whereby to permit the contact pin to form an electrical connection with said contact element, means for locking the adapter in the base of said fuse block, and means connecting the contact pin with the other wire of said electrical circuit connections.

JESSE STONE.